Patented Nov. 23, 1948

2,454,273

UNITED STATES PATENT OFFICE 2,454,273

CELLULOSE ETHER COMPOSITION

Richard F. B. Cox, Wilmington, Del., assignor to Hercules Powder Company, Wilmington, Del., a corporation of Delaware No Drawing. Application July 28, 1945,
Serial No. 607,668

8 Claims. (Cl. 106—176)

This invention relates to a plastic composition and, more particularly, to a composition comprising a cellulose ether and a particular stabilizer therefor.

Cellulose ethers have been used in a variety of applications such as in textile finishing or printing compositions, films, foils, sheets, fabrics, filaments, and numerous molded or cast articles, such as combs, buttons, tableware, brushes, radio parts, molds, and the like. Compositions of cellulose ethers have been subjected to injection and compression molding operations and extrusions and other well-known operations.

In the formation of molding or casting compositions, it is vitally important that the compositions should not be degraded by the conditions to which they are subjected during the compounding, molding, or casting operations. Such degradation results in lowered flexibility, embrittlement, and loss of impact strength, which usually follow the marked lowering of the viscosity of the cellulose ether. It is also important that the cellulose ether composition should not develop undesirable coloring during the compounding, molding, or casting operations. The color and viscosity degradation mechanisms are not fully understood but apparently result in a breakdown of the cellulose molecule into smaller molecules, in addition to the other detrimental phenomena.

The quality of a molded article is based upon the inherent toughness of the composition from which the article is made and the ability of the composition to retain its original shape and dimension under stress, high and low temperatures, and other degrading or detrimental influences. A further basis for judging quality is the ability of a molded article to withstand weathering to such a degree that surface crazing does not occur. This phenomenon, comprising the eventual opacifying of clear plastic surfaces has been especially serious where cellulose ether compositions were used, since such compositions are somewhat unstable in the presence of air, sunlight, molding temperatures, etc.

Cellulose ether compositions have been made up into thin sheets for use as a wrapping material, adhesive tape, etc., and in heavier sheets which have been used for flexible windows, paneling, etc. Resistance of these compositions to the degrading effects of heat, ultraviolet light, oxygen, and outdoor weathering is very important, and it is also essential to avoid development of undesirable color during the lifetime of the molded article, sheeting, etc.

The ordinary materials added to various organic substances to prevent oxidation, rancidity, discoloration, etc., have proved, for the most part, to be substantially ineffective in, first, promoting inherent tensile strength; second, maintaining tensile strength during molding and weathering; and third, preventing crazing during aging and weathering. Under these circumstances, it appeared necessary to investigate entirely new substances in an effort to find a material which would satisfy the above conditions.

Numerous compounds are known which stabilize cellulose ethers to a limited degree, but very few are satisfactory where light-colored or pastel-tinted compositions are prepared therefrom. This is because of the fact that numerous of these stabilizing substances, while maintaining viscosity stability, are highly colored or develop colored compounds upon oxidation, heating, weathering, etc. When colorless, light-colored, or pastel compositions are required, it is essential that all components be free from undesirable coloring matter originally and during the life of the composition.

Now, in accordance with the present invention, marked improvements have been made in the color stability and viscosity stability of cellulose ether compositions by the addition of small amounts of a methoxy phenol lactone which has the empirical formula $C_{20}H_{22}O_7$ and which forms a triacetate melting at about 161° C.

The following examples illustrate the beneficial effect of addition of the described methoxy phenol lactone upon the retention of viscosity and flexibility of films of ethyl cellulose, when subjected to heat, ultraviolet light, and outdoor weathering.

EXAMPLE I

STABILIZATION AGAINST ULTRAVIOLET LIGHT DEGRADATION

Films of ethyl cellulose (45.0% ethoxyl, 100 centipoises viscosity) three mils thick and containing the indicated amounts of the methoxy phenol lactone were cast from 80:20 toluene:alcohol solution and exposed to the fadeometer for 100 hours. Viscosity retention figures are given in Table 1.

*Table 1*

| Sample | Percent Methoxy Phenol Lactone | Percent Viscosity Retention | Flexibility |
|---|---|---|---|
| A | 0 | 2-9 | Brittle. |
| B | 0.5 | 65-75 | Flexible. |
| C | 1.0 | 79-90 | Do. |
| D | 2.0 | 81 | Do. |
| E | 3.0 | 93 | Do. |

EXAMPLE II

STABILIZATION AGAINST OUTDOOR WEATHERING DEGRADATION

Ethyl cellulose (45.0% ethoxyl, 100 centipoises viscosity) films containing the methoxy phenol lactone or a mixture of the same with other stabilizers were exposed on a standard weathering rack for 80 days and then tested for flexibility and viscosity. Results of the tests are compared in Table 2 below.

*Table 2*

EFFECT OF OUTDOOR WEATHERING

| Stabilizer | Flexibility | Viscosity Retention |
|---|---|---|
| | | *Per cent* |
| Blank | Extremely brittle | 8 |
| 1% Methoxy Phenol Lactone | Flexible | 90 |
| 0.5% Methoxy Phenol Lactone + 0.5% Hydroquinone Monobenzyl Ether | do | 92 |
| 0.5% Methoxy Phenol Lactone + 0.5% Syringic Acid | do | 71 |

The data in Table 2 show that the methoxy phenol lactone can be used in conjunction with other stabilizing agents, such as hydroquinone monobenzyl ether and syringic acid, to produce satisfactory stabilizing effects.

EXAMPLE III

STABILIZATION OF ETHYL CELLULOSE-PLASTICIZER COMPOSITIONS DURING MOLDING

Ethyl cellulose molding compositions having ingredients as set forth in Table 3 were molded into standard test bars, using pressure of about 2000 lb./sq. in. for about 10 minutes at temperatures of between 350 and 400° F. Sample B contained the methoxy phenol lactone in the isopropylate form and was compared with unstabilized sample A. Results of tests made on the molded bars are given in Table 3 below.

*Table 3*

| | A | B |
|---|---|---|
| Ethyl Cellulose, 100 Cps. Vis. 44.5 Ethoxyl parts | 480 | 480 |
| Glycerol Ester of Hydrogenated Rosin do | 36 | 36 |
| Dibutyl Phthalate do | 36 | 36 |
| Hydrogenated Castor Oil do | 24 | 24 |
| Camphor do | 24 | 24 |
| Methoxy Phenol Lactone Isopropylate do | 0 | 36 |
| Viscosity Retention after Injection Molding per cent | 41.5 | 92.9 |

There were no appreciable color differences between the unstabilized and stabilized samples shown in Examples I, II, and III.

EXAMPLE IV

STABILIZATION OF ETHYL CELLULOSE-PLASTICIZER-WAX MIXTURES AGAINST DEGRADATION DURING MOLDING

Ethyl cellulose molding compositions having the ingredients shown in Table 4 were molded as described in Example III. Stability characteristics of sample C, containing no stabilizer, were compared with those of sample D, which contained 3% of the methoxy phenol lactone, based on the weight of the ethyl cellulose. Results of this comparison are given in Table 4.

*Table 4*

| | C | D |
|---|---|---|
| Ethyl Cellulose, 125 Cps. Vis., 45.0% Ethoxyl parts | 8 | 8 |
| Triphenyl Phosphate do | 1 | 1 |
| Dibutyl Phthalate do | 1 | 1 |
| Blue Dye do | 0.05 | 0.05 |
| Methoxy Phenol Lactone Isopropylate do | 0 | 0.24 |
| Viscosity Retention after Injection Molding Per cent | 43.8 | 89.5 |

EXAMPLE V

STABILIZATION OF ETHYL CELLULOSE-PLASTICIZER-PIGMENT COMPOSITIONS AGAINST DEGRADATION DURING MOLDING

Pigmented ethyl cellulose compositions were molded as described in Example III. The relative quantities of ingredients are shown in Table 5. The stability of sample E was compared with that of sample F. The former sample contained no stabilizer, while the latter contained 1% of the methoxy phenol lactone, based on the ethyl cellulose.

*Table 5*

| | E | F |
|---|---|---|
| Ethyl Cellulose 44.7% Ethoxyl, 80 Cps. Vis parts | 60 | 60 |
| Titanium Dioxide Pigment do | 10 | 10 |
| Mineral Oil do | 5 | 5 |
| Triphenyl Phosphate do | 10 | 10 |
| Methoxy Phenol Lactone Isopropylate do | 0 | 0.6 |
| Viscosity Retention after Injection Molding per cent | 40 | 90 |

EXAMPLE VI

STABILIZATION OF PIGMENTED ETHYL CELLULOSE-PLASTICIZER-WAX COMPOSITIONS AGAINST DEGRADATION DURING MOLDING

The ethyl cellulose compositions shown in Table 6 were molded as described in Example III so as to compare the stability characteristics of samples G and H. The former sample was unstabilized, while the latter contained 2% of the methoxy phenol lactone, based on the weight of the cellulose ether.

*Table 6*

| | G | H |
|---|---|---|
| Ethyl Cellulose, 45.5% Ethoxyl, 125 Cps. Vis parts | 50 | 50 |
| Olive Drab Pigment do | 5 | 5 |
| Mineral Oil do | 1 | 1 |
| Raw Castor Oil do | 3 | 3 |
| Glycerol Tributyrate do | 8 | 8 |
| Spermaceti Wax do | 1 | 1 |
| Methoxy Phenol Lactone Isopropylate do | 0 | 1 |
| Viscosity Retention after Injection Molding per cent | 40 | 90 |

EXAMPLE VII

STABILIZATION AGAINST HEAT AND OXYGEN

Four ethyl celluloses having various resistances to degradation in the absence of stabilizers, were dissolved in 80:20 toluene:alcohol to form 20% solutions. The amounts of stabilizers added to portions of these solutions are indicated in Table 7, below, the percentage of stabilizer being based on the ethyl cellulose. Films of unstabilized and stabilized portions of each sample were cast and, after drying, were hung in an air oven at 120° C. for 48 hours. Samples of the films, both before and after heating were tested for viscosity. The percent of viscosity retention of each of the samples is presented in Table 7. Heating did not substantially affect the color of the stabilized samples, while the unstabilized ethyl celluloses darkened considerably during the heat-treatment.

*Table 7*

| Sample | Per Cent Resin-Phenol Lactone | Per Cent Viscosity Retention |
|---|---|---|
| A-1 | 0 | 1.6 |
| A-2 | 1 | 65.0 |
| B-1 | 0 | 10.3 |
| B-2 | 1 | 100.0 |
| C-1 | 0 | 33 |
| C-2 | 0.5 | 66 |
| C-3 | 1.5 | 92 |
| C-4 | 2.5 | 86 |
| C-5 | 3.5 | 85 |
| D-1 | 0 | 63.4 |
| D-2 | 1 | 100.0 |

The exact structure of the methoxy phenol lactone has not been ascertained, but the lactone may be obtained, for example, by extraction of a crude pine wood rosin, which contains petroleum hydrocarbon-insoluble matter, by the following method:

B wood rosin (350 parts) was dissolved in benzene (1050 parts). The solution was extracted with 80% methanol (2300 parts). The methanol layer was separated from the benzene layer and evaporated to yield a crude methoxy phenol lactone. The crude methoxy phenol lactone (4 parts) was dissolved at 60° C. in ethyl alcohol (5 parts). Upon cooling to room temperature, the purified methoxy phenol lactone (2 parts) crystallized as the substantially colorless alcoholate, having a melting point of 65° ±0.5° C., and by analysis was shown to have a formula corresponding to $C_{20}H_{22}O_7 \cdot C_2H_5OH$. The yield is usually between 0.1–5% when B wood rosin is employed.

D wood rosin is the rosin fraction obtained from the furfural extract of the mixture of resins removed from pine wood chips by benzene extraction. Typical analyses of B wood rosin fall within the following limits:

| | | |
|---|---|---|
| Unsaponifiable material | per cent | 10– 20 |
| Gasoline-insoluble material | do | 35– 75 |
| Acid number | | 100–130 |
| Saponification number | | 140–160 |
| Drop melting point | degrees | 85– 95 |

The methoxy phenol lactone may be isolated from its alcoholate by distillation of the alcohol to yield a lactone having two phenolic hydroxyl groups, one alcoholic hydroxyl group, one lactone group, and two methoxy groups. In the free state, it has a specific rotation of about −54° (2% in alcohol), a softening point of about 93–94° C., and is substantially gasoline-insoluble. One typical derivative is the sodium salt which has a specific rotation of about +8° (0.5% in water), a capillary melting point of about 275° C., and is also substantially gasoline-insoluble, substantially insoluble in rosin size solutions, and substantially colorless. Another characterizing derivative is the triacetate having a melting point of about 161° C. and a specific rotation of $$[\alpha]_D - 118.8°$$

(5% in chloroform).

Alternatively, the methoxy phenol lactone may be obtained by tracting other rosin fractions with water and precipitating the water-insoluble sodium salt therefrom.

Other alcoholates (alcoholates of crystallization) may be prepared by crystallization of the lactone from other alcohols such as ethyl (M. P. 64.5–65.5° C.), propyl (M. P. 69–70° C.), isopropyl (M. P. 80–81° C.), or tertiary butyl (M. P. 71–72° C.). The alcoholates may be used to stabilize cellulose ethers in a manner identical with that employing the methoxy phenol lactone, and it is to be understood that the alcoholates are considered clearly equivalent to the methoxy phenol lactone and within the scope of the claimed compositions.

The stabilizer is effective in small amounts. Amounts between about 0.5% and about 7.5%, based on the weight of the ether, may be used. Amounts between about 0.5% and about 3% are preferred, and still more preferably, the stabilizer will be employed in an amount equivalent to about 1% of the cellulose ether. The most effective stabilization is obtained when the stabilizer is present in amounts between about 0.5% and about 3%; amounts substantially less than 0.5% do not effectively stabilize the cellulose ether. Maximum stability is reached at about 7.5%, greater amounts having no appreciable effect.

The methoxy phenol lactone is a definite chemical compound apparently capable of synthesis and is not to be confused with the source or material from which it may be obtained. The lactone is somewhat water-soluble, while it is well known that rosins and pine wood resins are substantially insoluble in water. An important distinguishing feature of the lactone is that its sodium salt tends to crystallize from rosin size solutions.

The methoxy phenol lactone stabilizer may be added to the cellulose ether composition during the compounding of the film or plastic so that it becomes thoroughly dispersed throughout the ether or ether composition. While the addition of the stabilizer compound during a mixing operation is possible, other suitable methods are within the contemplation of the invention, such as addition during a finishing operation or by addition of the stabilizer during tumbling operations, the latter method being preferred.

Plasticizers for cellulose ethers, such as tributylphosphate, tricresylphosphate, triphenylphosphate, dimethyl phthalate, diphenyl phthalate; vegetable oil fatty acids, such as castor oil fatty acids; fatty alcohols, such as lauryl alcohol; and vegetable oils, such as linseed oil, etc., may be incorporated in amounts necessary to the particular use to which the composition is to be put.

Waxes are an important part of numerous cellulose ether compositions. Suitable species include beeswax, paraffin, japan, opal, stearin, spermaceti, carnauba, barnsdall, anthracene, and tallow waxes. They are used in amounts varying from about 0 to about 10% in films, 1% being preferred. In molding compositions, from about 0 to about 5% is used, 1% being preferred, based on the weight of the cellulose ether. Plasticizers are generally present in amounts varying from about 2 to about 100 parts per part of cellulose ether in the case of films and from about 2 to about 20 parts per 100 parts of cellulose ether in the case of molding compositions.

In addition, fillers, pigments, and coloring matter may be present in cellulose ethers in amounts up to about 20%, based on the weight of the cellulose ether.

The stability of cellulose ether compositions to heat, ultraviolet light, and outdoor weathering may be measured by subjecting said compositions to these environments under standardized conditions and then testing them for the percentage retention of viscosity, flexibility, and color. In many cases, the percentage viscosity retention is substantially equivalent to flexibility because lower flexibility tending toward brittleness indicates a lower viscosity.

In testing the stability of the samples shown in Examples I, II, and III, the percentage viscosity retention was measured by the following method: Two duplicate samples of each cellulose ether composition were carefully weighed out. One sample was made up into a 5% solution with 80:20 toluene:alcohol and the viscosity measured. The other sample was subjected to the test conditions described in each example and then made up into a 5% solution with the same test solvent and tested like the first sample. The ratio of the two viscosities indicated the stability of the composition.

While the above examples contained in this specification have employed ethyl cellulose for purposes of illustration, the invention is applicable to other cellulose ethers including other alkyl ethers, such as methyl or propyl ether; aralkyl ethers, such as benzyl ether; and mixed cellulose ethers.

The degree of substitution and the viscosity of the cellulose ether do not affect the stabilizing action of the methoxy phenol lactone. When ethyl cellulose is the cellulose ether employed, the ethoxyl usually will vary within the ranges commercially available, although the types having an ethoxyl content between 40.0 and 52.0% are generally used for most purposes. For molded articles of ethyl cellulose, a viscosity of about 50–300 centipoises is ordinarily used, and films are usually made up of 20–100 centipoise viscosity grades.

Thus, according to the present invention, the methoxy phenol lactone having an empirical formula of $C_{20}H_{22}O_7$ and forming a triacetate having a melting point of 161° C., has been found to be a very effective heat, ultraviolet light, and outdoor weathering stabilizer for cellulose ether compositions. The stability was attained either with or without other ingredients, such as plasticizers, waxes, etc., being present, and the retention of viscosity, flexibility, and color was found to be considerably improved over unstabilized ethers.

What I claim and desire to protect by Letters Patent is:

1. A thermoplastic composition consisting of a cellulose ether, a plasticizer therefor, and from about 0.5% to about 7.5% of methoxy phenol lactone as a stabilizer therefor, based on the weight of the cellulose ether, said lactone being substantially gasoline-insoluble and having an empirical formula of $C_{20}H_{22}O_7$, said lactone further having two phenolic hydroxyl groups, one alcoholic hydroxyl group, one lactone group, and two methoxy groups and forming a triacetate derivative melting at about 161° C.

2. A thermoplastic composition consisting of a cellulose ether, a plasticizer therefor, and from about 0.5% to about 7.5% of methoxy phenol lactone as a stabilizer therefor, based on the weight of the cellulose ether, said lactone being substantially gasoline-insoluble and having an empirical formula of $C_{20}H_{22}O_7$, said lactone further having two phenolic hydroxyl groups, one alcoholic hydroxyl group, one lactone group, and two methoxy groups and forming a triacetate derivative melting at about 161° C., and less than about 20%, based on the weight of the cellulose ether, of a coloring material.

3. A thermoplastic composition consisting of a cellulose ether, a plasticizer therefor, and from about 0.5% to about 7.5% of methoxy phenol lactone as a stabilizer therefor, based on the weight of the cellulose ether, said lactone being substantially gasoline-insoluble and having an empirical formula of $C_{20}H_{22}O_7$, said lactone further having two phenolic hydroxyl groups, one alcoholic hydroxyl group, one lactone group, and two methoxy groups and forming a triacetate derivative melting at about 161° C., and from about 0 to about 20%, based on the weight of the cellulose ether, of a pigment.

4. A thermoplastic composition consisting of a cellulose ether, a plasticizer therefor, and from about 0.5% to about 7.5% of methoxy phenol lactone as a stabilizer therefor, based on the weight of the cellulose ether, said lactone being substantially gasoline-insoluble and having an empirical formula of $C_{20}H_{22}O_7$, said lactone further having two phenolic hydroxyl groups, one alcoholic hydroxyl group, one lactone group, and two methoxy groups and forming a triacetate derivative melting at about 161° C., and from about 0 to about 10%, based on the weight of the cellulose ether, of a wax.

5. A thermoplastic composition consisting of the following ingredients in the following parts by weight ranges:

| | Parts |
|---|---|
| A cellulose ether | 100 |
| Methoxy phenol lactone having an empirical formula of $C_{20}H_{22}O_7$, being substantially gasoline-insoluble, having two phenolic hydroxyl groups, one alcoholic hydroxyl group, one lactone group, and two methoxy groups and forming a triacetate derivative melting at about 161° C. | 0.5–7.5 |
| Coloring matter | 0–20 |
| Plasticizer for ethyl cellulose | 2–100 |
| Wax | 0–10 |

6. A molding composition consisting of the following ingredients in the following parts by weight ranges:

| | Parts |
|---|---|
| An ethyl cellulose (49–52% ethoxyl 50–300 Cps. Vis.) | 100 |
| Methoxy phenol lactone having an empirical formula of $C_{20}H_{22}O_7$, being substantially gasoline-insoluble, having two phenolic hydroxyl groups, one alcoholic hydroxyl group, one lactone group, and two methoxy groups and forming a triacetate derivative melting at about 161° C. | 0.5–7.5 |
| Coloring matter | 0–20 |
| Plasticizer for ethyl cellulose | 2–15 |
| Wax | 0–5 |

7. A film-forming composition consisting of the following ingredients in the following parts by weight ranges:

| | Parts |
|---|---|
| An ethyl cellulose (40–52% ethoxyl, 20–100 Cps. Vis.) | 100 |
| Methoxy phenol lactone having an empirical formula of $C_{20}H_{22}O_7$, being substantially gasoline-insoluble, having two phenolic hydroxyl groups, one alcoholic hydroxyl group, one lactone group, and two methoxy groups and forming a triacetate derivative melting at about 161° C. | 0.5–7.5 |
| Coloring matter | 0–20 |
| Plasticizer for ethyl cellulose | 2–100 |
| Wax | 0–10 |

8. A cellulose ether having distributed therethrough from about 0.5% to about 7.5% of a methoxy phenol lactone as a stabilizer therefor, based on the weight of the cellulose ether, said lactone being substantially gasoline-insoluble and having an empirical formula $C_{20}H_{22}O_7$, said lactone further having two phenolic hydroxyl groups, one alcoholic hydroxyl group, one lactone group, and two methoxy groups and forming a triacetate derivative melting at about 161° C.

RICHARD F. B. COX.

REFERENCES CITED

The following references are of record in the file of this patent:

UNITED STATES PATENTS

| Number | Name | Date |
|---|---|---|
| 2,069,726 | Schantz | Feb. 2, 1937 |
| 2,221,540 | Hall | Nov. 12, 1940 |
| 2,273,725 | Ray | Feb. 17, 1942 |
| 2,359,972 | De Bell | Oct. 10, 1944 |